United States Patent
Aou et al.

(10) Patent No.: US 9,816,008 B2
(45) Date of Patent: Nov. 14, 2017

(54) PROCESS FOR MAKING URETHANE-ISOCYANATES

(71) Applicant: DOW GLOBAL TECHNOLOGIES LLC, Midland, MI (US)

(72) Inventors: Kaoru Aou, Lake Jackson, TX (US); Juan Carlos Medina, Lake Jackson, TX (US); Rajesh P. Paradkar, Lake Jackson, TX (US); Dwight D. Latham, Clute, TX (US)

(73) Assignee: Dow Global Technologies LLC, Midland, MI (US)

( * ) Notice: Subject to any disclaimer, the term of this patent is extended or adjusted under 35 U.S.C. 154(b) by 151 days.

(21) Appl. No.: 14/763,517

(22) PCT Filed: Mar. 21, 2014

(86) PCT No.: PCT/US2014/031520
§ 371 (c)(1),
(2) Date: Jul. 26, 2015

(87) PCT Pub. No.: WO2014/160616
PCT Pub. Date: Oct. 2, 2014

(65) Prior Publication Data
US 2016/0002496 A1 Jan. 7, 2016

Related U.S. Application Data

(60) Provisional application No. 61/805,967, filed on Mar. 28, 2013.

(51) Int. Cl.

| | |
|---|---|
| C09D 175/08 | (2006.01) |
| C08G 18/00 | (2006.01) |
| C08G 18/02 | (2006.01) |
| C08G 18/09 | (2006.01) |
| C08G 18/10 | (2006.01) |
| C08G 18/18 | (2006.01) |
| C08G 18/32 | (2006.01) |
| C08G 18/76 | (2006.01) |

(52) U.S. Cl.
CPC ......... *C09D 175/08* (2013.01); *C08G 18/003* (2013.01); *C08G 18/022* (2013.01); *C08G 18/092* (2013.01); *C08G 18/10* (2013.01); *C08G 18/1875* (2013.01); *C08G 18/3206* (2013.01); *C08G 18/7664* (2013.01); *C08G 2105/02* (2013.01); *C08G 2125/00* (2013.01); *C08G 2261/60* (2013.01)

(58) Field of Classification Search
CPC .............. C08G 18/7664; C08G 18/003; C08G 18/022; C08G 18/092; C08G 18/10; C08G 18/1875; C08G 18/3206; C08G 2105/02; C08G 2125/00; C08G 2261/60; C09D 175/08
See application file for complete search history.

(56) References Cited

U.S. PATENT DOCUMENTS

| | | |
|---|---|---|
| 3,378,511 A | 4/1968 | Newton |
| 3,494,888 A | 2/1970 | McElroy |
| 3,914,198 A | 10/1975 | Olstowski |
| 4,011,063 A | 3/1977 | Johnston |
| 4,165,414 A | 8/1979 | Narayan |
| 4,255,569 A | 3/1981 | Mueller |
| 4,503,167 A | 3/1985 | White |
| 4,607,064 A | 8/1986 | Kuhn |
| 5,076,958 A | 12/1991 | Pedain |
| 2006/0084777 A1 | 4/2006 | Bleys |

FOREIGN PATENT DOCUMENTS

WO 2010/049467 A 5/2010

OTHER PUBLICATIONS

Odian, G., Principles of Polymerization, 1991, pp. 29-33.*
Janvi, "Soybean Oil-based Polyisocyanurate Cast Resins", J. Appl. Polym. Sci. 90 (2003) 3333-3337.
Hongyan, "Interlaminar fracture properties . . . ", Optoelectronics and Advanced Materials—Rapid Communications vol. 4 (Sep. 2010) 1391-1395.

* cited by examiner

*Primary Examiner* — Patrick Niland

(57) ABSTRACT

Polyisocyanurate or polyurethane-isocyanate polymers are made by curing an aromatic polyisocyanate or a mixture of at least one aromatic polyisocyanate and at least one polyol having a hydroxyl equivalent weight of up to 200 in which the isocyanate index is at least 2.00, in the presence of at least one isocyanate trimerization catalyst, to form a polyisocyanurate or polyurethane-isocyanate polymer having a glass transition temperature of at least 100° C., and then exposing the polyisocyanurate or polyurethane-isocyanurate polymer formed step a) to water under superatmospheric pressure at a temperature of at least 70° C.

14 Claims, No Drawings

PROCESS FOR MAKING URETHANE-ISOCYANATES

This invention relates to urethane-isocyanurate polymers and methods for making them.

Phenolic-formaldehyde resins have been in use for over a century. These materials are very hard organic polymers. They are used, for example, in circuit boards, many types of electrical laminates, countertops, bearings, binders in friction surfaces such as brake pads, brake shoes and clutch disks, to make billiard and snooker balls, and other applications where their hardness is a desirable attribute.

These polymers often contain residual formaldehyde, which can outgas during its service life and create exposure issues. For this reason, there is a strong push to find alternative materials. However, few other organic polymers can match the hardness of phenolic-formaldehyde types.

In some applications, phenolic-formaldehyde resins are subjected to conditions of high temperature, elevated pressures and moisture. Examples of these applications include, for example, composite materials used as conduits for high-temperature water and/or steam, certain undersea applications, and coatings for materials that are exposed during use to steam or high temperature water. Under those conditions, the resins exhibit a loss of properties. It also can lose mass to the surrounding moisture. For example, when phenolic-formaldehyde resins are immersed in high temperature water, decomposition products are often seen leaching into the water, leading to the water turning milky white. For these applications, an alternative polymer that maintains its properties better would be desirable.

In one aspect, this invention is a method for making an isocyanurate or polyurethane-isocyanurate polymer, comprising a) curing an aromatic polyisocyanate or a mixture of at least one aromatic polyisocyanate and at least one polyol having a hydroxyl equivalent weight of up to 200 in which the isocyanate index is at least 2.00, in the presence of at least one isocyanate trimerization catalyst, to form a polyisocyanurate or polyurethane-isocyanurate polymer having a glass transition temperature of at least 100° C., and b) exposing the polyisocyanurate or polyurethane-isocyanurate polymer formed step a) to water under superatmospheric pressure at a temperature of at least 70° C.

Surprisingly, the polyisocyanurate or polyurethane-isocyanurate polymer formed in step a) of the process is highly resistant to the conditions encountered during the high temperature water exposure step b). In many cases, the glass transition temperature of the polyisocyanurate or polyurethane-isocyanurate polymer has been found to actually increase as a result of the high temperature water exposure step. This effect is very surprising and not easily accounted for. It is also contrary to the performance of phenolic-formaldehyde resins.

The high temperature water exposure step b) may be performed during the use of the polymer in its intended application, or as a separate manufacturing step unconnected to its ultimate use.

In step a) of the process, a polyisocyanurate or polyurethane-isocyanurate polymer is produced by curing an aromatic polyisocyanate or mixture of aromatic polyisocyanate and a polyol.

The aromatic polyisocyanate preferably has an average isocyanate functionality from about 1.9 to 4, and more preferably from 2.0 to 3.5. The average isocyanate equivalent weight can be from about 80 to 160, more preferably 120 to 150. Exemplary polyisocyanates include, for example, m-phenylene diisocyanate, 2,4- and/or 2,6-toluene diisocyanate (TDI), the various isomers of diphenylmethanediisocyanate (MDI), naphthylene-1,5-diisocyanate, methoxyphenyl-2,4-diisocyanate, 4,4'-biphenylene diisocyanate, 3,3'-dimethoxy-4,4'-biphenyl diisocyanate, 3,3'-dimethyldiphenylmethane-4,4'-diisocyanate, 4,4',4''-triphenylmethane tri-isocyanate, polymethylene polyphenylisocyanates, toluene-2,4,6-triisocyanate, and 4,4'-dimethyl diphenylmethane-2,2', 5,5'-tetraisocyanate. Derivatives of any of the foregoing that have, for example, urea, urethane, carbodiimide, biuret, allophanate and uretonimine linkages, are also useful. Preferred polyisocyanates include MDI, so-called 'polymeric MDI' products which are mixtures of MDI and polymethylene polyphenylisocyanates, derivatives of MDI such as biuret- and/or allophanate-modified "liquid" MDI products, and other MDI derivatives that have, for example, urea, urethane, carbodiimide, biuret, allophanate and uretonimine linkages.

Although the aromatic polyisocyanate can be cured by itself, it is generally preferred to cure a mixture of the aromatic polyisocyanate and one or more polyols. In the latter case, the isocyanate index is at least 2 and can be any higher value, such as at least 2.1, at least 2.5, or at least 3.0. Isocyanate index here is the stoichiometric ratio of the isocyanate functional groups to the active hydrogens in the polyol/isocyanate formulation. The upper limit on the isocyanate index, when a polyol is present, may be, for example, up to 10, up to 6, up to 5 or up to 4.

The polyol(s) have a hydroxyl equivalent weight of up to 200. In some embodiments, the hydroxyl equivalent weight is 45 to 160 and more preferably 80 to 160. The polyol preferably contains 2 to 8 hydroxyl groups per molecule, more preferably 3 to 6 hydroxyl groups per molecule.

Examples of suitable polyols include ethylene glycol, diethylene glycol, triethylene glycol, 1,2-propane diol, dipropylene glycol, tripropylene glycol, 1,4-butane diol, 1,6-hexane diol, glycerin, trimethylolpropane, trimethylolethane, pentaerythritol, erythritol, sorbitol, sucrose, cyclohexanedimethanol and the like. Also useful are alkoxylates of any of the foregoing that have hydroxyl equivalent weights of up to 200, preferably up to 160. The alkoxylates are preferably formed by adding propylene oxide and/or ethylene oxide to the respective polyols.

Alkoxylates of ammonia or primary or secondary amine compounds such as aniline, toluene diamine, ethylene diamine, diethylene triamine, piperazine, aminoethylpiperazine and the like, which have a hydroxyl equivalent weight of up to 200, preferably 45 to 160 and more preferably 80 to 160, are also useful.

Polyester polyols having a hydroxyl equivalent weight up to 200, preferably up to 160 are also useful.

The polyisocyanate or polyisocyanate/polyol mixture is cured in the presence of an isocyanate trimerization catalyst. If a polyol is present, a urethane catalyst, i.e., a catalyst for the reaction of an isocyanate with a hydroxyl group, can be used in addition to the trimerization catalyst. A urethane catalyst is preferred particularly if the polyol does not have any primary hydroxyl groups.

Trimerization catalysts include, for example, strong bases such as alkali metal phenolates, alkali metal alkoxides, alkali metal carboxylates, quaternary ammonium salts, and the like. Among the alkali metal trimerization catalysts are sodium p-nonylphenolate, sodium p-octyl phenolate, sodium p-tert-butyl phenolate, sodium formate, sodium acetate, sodium propionate, sodium butyrate, sodium 2-ethylhexanoate, glycine N-[(2-hydroxy-5-nonylphenyl) methyl]-N-methyl-monosodium salt, potassium p-nonylphenolate, potassium p-octyl phenolate, potassium p-tert-butyl phenolate, potassium formate, potassium acetate, potassium propionate, potassium butyrate, potassium 2-ethylhexanoate, glycine N-[(2-hydroxy-5-nonylphenyl)methyl]-N-methyl-monopotassium salt, cesium p-nonylphenolate, cesium p-octyl phenolate, cesium p-tert-butyl phenolate, cesium formate, cesium acetate, cesium propionate, cesium butyrate, cesium 2-ethylhexanoate and glycine N-[(2-hydroxy-5-nonylphenyl)methyl]-N-methyl-monocesium salt. Among the useful ammonium salts are (2-hydroxypropyl)trimethylammonium 2-ethylhexanoate, (2-hydroxypropyl)trimethylammonium formate and the like. Aminophenolic compounds such as N,N',N"-tris(3-dimethylaminopropyl)hexahydro-s-triazine are also useful trimerization catalysts. Imidazolium or imidazolinium salts can also be used as trimerization catalysts, such as 1-ethyl, 2-methyl-imidazolium acetate, 1,3-di-tert-butyl-imidazolinium acetate, 1,3-diadamantyl-imidazolium acetate, 1,3-diisopropyl-imidazolium acetate 1,3-di-tert-butyl-imidazolium acetate, 1-butyl-3-methylimidazolium acetate, and others disclosed in US 2011/0201709 A1. The alkali metal and ammonium compounds are generally preferred.

Examples of urethane catalysts include various amines, tin carboxylates; organotin compounds; tertiary phosphines; various metal chelates; metal salts of strong acids, such as ferric chloride, stannic chloride, stannous chloride, antimony trichloride, bismuth nitrate and bismuth chloride, and the like. Amine and tin catalysts are generally preferred. The amine catalysts preferably do not contain amine hydrogens.

Representative amine catalysts include trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl) ether, morpholine, 4,4'-(oxydi-2,1-ethanediyl)bis, triethylenediamine, pentamethyl diethylene triamine, dimethyl cyclohexyl amine, N-cetyl N,N-dimethyl amine, N-coco-morpholine, N,N-dimethyl aminomethyl N-methyl ethanol amine, N, N, N'-trimethyl-N'-hydroxyethyl bis(aminoethyl) ether, N,N-bis(3-dimethylaminopropyl)N-isopropanolamine, (N,N-dimethyl) amino-ethoxy ethanol, N, N, N', N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl) amino-2-propanol, tetramethylamino bis (propylamine), (dimethyl(aminoethoxyethyl))((dimethyl amine)ethyl)ether, tris(dimethylamino propyl) amine, dicyclohexyl methyl amine, bis(N,N-dimethyl-3-aminopropyl) amine, 1,2-ethylene piperidine and methyl-hydroxyethyl piperazine.

Examples of useful tin-containing catalysts include stannous octoate, dibutyl tin diacetate, dibutyl tin dilaurate, dibutyl tin dimercaptide, dialkyl tin dialkylmercapto acids, dibutyl tin oxide, dimethyl tin dimercaptide, dimethyl tin diisooctylmercaptoacetate, and the like.

The trimerization catalyst can be present, for example, in an amount from 0.01 to 5 parts by weight, based on the combined weight of the polyisocyanate and polyol (if present). A preferred amount is 0.05 to 1 part on the same basis. A still more preferred amount is 0.1 to 0.5 parts on the same basis.

The urethane catalyst, when present, is typically present in amounts as described with respect to the trimerization catalyst.

Various optional ingredients can be included in the reaction mixture during step a) of the process. These include, for example, reinforcing agents such as fibers and flakes which have an aspect ratio (ratio of largest to smallest orthogonal dimension) of at least 5. These fibers and flakes may be, for example, an inorganic material such as glass, mica, other ceramic fibers and flakes, carbon fibers, organic polymer fibers that are non-melting and thermally stable at the temperatures encountered in steps a) and b) of this process (such as polyamide fibers), and the like. Another useful optional ingredient is a low aspect ratio particulate filler. Such a filler may be, for example, sand, clay, other minerals, or an organic polymer that is non-melting and thermally stable at the temperatures encountered in steps a) and b) of the process. Such a particulate filler has a particle size (as measured by sieving methods) of less than 100 μm.

The reaction mixture may also contain an epoxy resin, by which it is meant a compound having two or more epoxy groups per molecule. The epoxy equivalent weight may be, for example, from 150 to 500 or from 170 to 250. Examples of epoxy resins include glycidyl ethers of polyphenols, although other types may be used as well. The epoxy resin may be present, for example, in an amount of up to 40 percent, preferably up to 25 percent of the combined weight of the epoxy resin, polyisocyanate(s) and polyol(s).

Still other useful optional ingredients include colorants, biocides, UV stabilizing agents, other preservatives, antioxidants, surfactants, and the like.

Although it is possible to include a blowing agent, it is preferred in this invention to exclude a blowing agent from the reaction mixture. The polyisocyanurate or polyurethane-isocyanurate polymer formed in step a) therefore preferably is a substantially non-cellular polymer having a density of at least 500 kg/m$^3$, preferably at least 750 kg/m$^3$ and still more preferably at least 950 kg/m$^3$. The density of the polymer has been found to change at most insignificantly during step b) of the process. Therefore, in preferred embodiments the polymer obtained from step b) of the process also is substantially non-cellular as well, having a density of at least 500 kg/m$^3$, preferably at least 750 kg/m$^3$ and still more preferably at least 950 kg/m$^3$ The aromatic polyisocyanate(s) or mixture thereof with the polyol(s) is cured in the first step of the invention. Methods for performing such polymerizations are well known in the art. In general, the reactants and catalysts as described above are combined, and then heated to an elevated temperature at which the trimerization of isocyanate groups proceeds. The elevated temperature may be, for example, at least 50° C., up to 180° C.

The glass transition temperature of the polymer obtained from this first polymerization step is at least 100° C., and may be as high as 250° C. Most typically, the glass transition temperature after step a) will be in the range of 140 to 225° C., especially 150 to 210° C.

For purposes of this invention, glass transition temperature is measured by dynamic mechanical thermal analysis (DMTA) at an oscillation frequency of 1 Hertz and a heating scan rate at 3° C./second from 20° C. to 200° C. The temperature corresponding to the peak of the tan delta curve is taken as the glass transition temperature ($T_g$) of the specimen tested.

The polymerization step a) can be performed in various ways. If a molded product is desired, the reaction mixture can be introduced into a suitable mold and cured therein. The reaction mixture can be applied onto the surface of any suitable substrate and cured thereon to form a coating thereon. The reaction mixture can be used to impregnate a substrate material or a reinforcing material, and then cured in the presence of the substrate to form a composite.

This polymerization step a) can be performed in two or more sub-steps. For example, the reaction mixture may be cured to its gel point in a first sub-step, advancing the cure enough to form a semi-solid or solid material that can be manipulated and/or further shaped prior to a subsequent curing sub-step that leads to the development of a high glass transition temperature polymer as described before. This method is suitable for, example, for forming various types of reinforced composites. This method is also amenable for making molded products. The reaction mixture can be polymerized in a mold until the polymer has obtained sufficient strength to allow it to be demolded without permanent distortion or damage, and then post-cured outside of the mold to complete the polymerization step.

The polyisocyanurate or polyurethane-isocyanurate polymer obtained from step a) is exposed to water at superatmospheric pressure at a temperature of at least 70° C. The temperature during this step (step b)) may be as high as 180° C., but preferably does not exceed 160° and more preferably is up to 140° C. A preferred temperature during this step is 100 to 130° C. The pressure is greater than 1 atmosphere (101.325 kPa) and can be any higher value. Typically, though, pressures greater than 100 atmospheres (about 10,000 kPa) do not provide additional benefit. The pressure may range, for example, from 150 kPa to 5000 kPa, or from 200 kPa to 5000 kPa.

In step b), the water can be provided in the form of a liquid or gas. If provided as a gas, the atmosphere preferably is saturated or super-saturated with water. It is preferred to provide at least part of the water as a liquid. If the temperature is 100° C. or above, it is preferred that the superatmospheric pressure is sufficient to maintain the water at least partially as a liquid.

The treatment time for step b) of the process can range, for example, from an hour to many days or longer. Step b) can be performed indefinitely during the use of the material. If step b) is performed as a separate step, it may be performed, for example for a period of one hour to 15 days, with a more preferred period being 12 hours to 10 days. In preferred embodiments, step b) is performed for a period of time sufficient to increase the glass transition temperature of the polyisocyanurate or polyurethane-isocyanurate polymer, by at least 5° C.

Step b) of the process can be performed as a separate production step, i.e., as a manufacturing step that is performed apart from and prior to the use of the polymer in its intended application. However, in many cases, step b) is performed in the course of the ordinary use of the polymer. For example, the polymer may be used under high temperature, superatmospheric humid or aqueous conditions which satisfy the requirements of step b) of the process. As before, if the water is in the form of a gas, the gas is preferably saturated or super-saturated with the water. Examples of such end-uses include, for example, autoclavable coatings; piping or other conduits for hot aqueous fluids (such as, for example, undersea production conduits), chemical process piping, cooling water conduits, or other applications in which the product is exposed to conditions of high temperature and high humidity or liquid water.

A surprising feature of this invention is that the polymer formed in step a) is quite resistant to the loss of physical properties upon exposure to water and high temperatures as seen in step b). Often, the glass transition temperature of the polymer actually increases during step b), which is quite surprising and unexpected. For example, the glass transition temperature in some embodiments may increase by 5° C. or more, by 10° C. or more and as much as 30° C., as much as 50° C. or even as much as 70° C. This increase in glass transition temperature is not easily accounted for. Even when the glass transition temperature does not increase during this step, it tends to remain nearly constant or at most decrease only slightly, such as by 10° C. or less or 5° C. or less. Typically, the polyisocyanurate or polyisocyanurate-urethane polymer obtained after step b) has a glass transition temperature of at least 150° C., with values from 160 to 250° C., especially 160 to 220° C., being typical.

The polyisocyanurate or polyurethane-isocyanurate polymer is in some embodiments formed as a coating onto a substrate. The substrate can be any convenient size and geometry ranging from large blocks to fibers to particulates such as, for example, sand particles. Such a particulate substrate should have a particle size as measured by sieving methods of at least 100 μm. The coating of the polyisocyanurate or polyurethane-isocyanurate polymer can be formed by applying a reaction mixture as described above to a surface or surfaces of the substrate, and the performing steps a) and b) as described above while the reaction mixture is on the substrate surface(s). Such a coating operation can be performed in a mold (which is suitable for larger substrates) or can be performed using various spraying, painting or other coating techniques to apply the reaction mixture to the surface of the substrate. Substrates can be coated by immersing them in the reaction mixture.

To form a coated particulate, the reaction mixture may be applied to the substrate particles using any convenient method including those described above. Step a) of the process can then be performed by separating the reaction mixture-coated particles before performing the polymerization, and/or by agitating the substrate particles as the reaction mixture cures to prevent unwanted agglomeration. It is also possible to perform step a) on the reaction mixture-coated particles to form an agglomerated or partially agglomerated mass, which is then broken into individual pieces after step a) or step b) is completed.

A wide variety of materials can be used as such a substrate. All that is necessary is that the substrate is a solid under the conditions of the coating process, and that the substrate does not dissolve or undesirably degrade or react under the conditions of the curing reaction. The substrate may react with one or more components of the reaction mixture to form bonds between substrate and coating. Examples of substrates include, for example, metals, ceramic materials, sand, clay, rock, stone, other organic polymers, wood or other plant material, various composites materials and the like. The coating thickness can range, for example from 0.1 μm to 15 cm or more, as desirable for the particular application. In specific applications, the coating thickness can be 100 μm to 2.5 mm, or from 250 μm to 1 mm.

In other embodiments of the invention, a reaction mixture as described before is applied to a fibrous reinforcement and then polymerized by performing step a) to form a fiber-reinforced composite. The fiber-reinforced composite in such a case will have a polymer phase, and a fiber phase that includes the fibrous reinforcement. The fiber phase is embedded in and bound together by the polyisocyanurate or polyurethane-isocyanurate polymer phase formed by polymerizing the reaction mixture (step a). Such a fiber-reinforced composite is useful, for example, as a conduit, especially for hot aqueous fluids but also for other fluids including various gasses and liquids; as a substrate for circuit boards, as a structural component of vehicles, tools, mechanized equipment and the like. In making such composites, step b) can be performed during the normal use of the composite, in cases in which such use subjects the composite to conditions of temperature, pressure and moisture as described herein. Alternatively, step b) can be performed as a separate manufacturing step.

The following examples are provided to illustrate the invention, and are not intended to limit the scope thereof. All parts and percentages are by weight unless otherwise indicated.

EXAMPLES

Polyisocyanurate (Ex. 9) and polyisocyanurate-polyurethane polymers are prepared in the following general process:

For step a): the polyol (if any) is charged into the mixing cup of a high-speed laboratory mixer (FlackTek Speed-Mixer). The catalyst(s) are then added and mixed thoroughly into the polyol at 800 rpm for 5 seconds, followed by 2000 rpm for 10 seconds. The polyisocyanate is then added into the mixing cup and mixed with the other components at the same mixing condition. The resulting reaction mixture is emptied onto a circular steel mold 14 cm in diameter and 0.5 cm deep, which has been previously sprayed with a mold release agent (STONER E236 mold release). The amount of reaction mixture in each case is about 50 grams. The reaction mixture is allowed to cure without applied heat until it has cured enough to demold. The resulting molding is then in each case postcured under air under conditions of time and temperature was indicated below.

Samples are cut from each molding. Some of the samples are taken to dynamic mechanical thermal analysis (DMTA). DMTA measurements are taken using an oscillation frequency of 1 sec$^{-1}$ and a heating rate of 3° C./minute. The glass transition temperature is taken in each case as the peak of the tan delta curve. The storage modulus is measured at 50° C. and 121° C.

Step b) is performed on samples cut from the moldings made in step a). The samples are immersed in deionized water in a Parr reactor. The headspace is charged to 500 psi (3450 kPa) with nitrogen and released three times to purge out residual oxygen. The headspace is then charged again to 500 psi (3450 kPa) with nitrogen and sealed. The sealed reactor is then heated to 121° C. for seven days. The reactor contents are allowed to come to room temperature. The samples are then removed and submerged in deionized water in a 50° C. oven until taken for DMTA analysis as before. Samples are removed from the 50° C. water bath immediately before DMTA analysis. Glass transition temperature is measured, as is the storage modulus G' at both 50° C. and 121° C.

The materials used in the following examples are as follows:
POLYOL A is a poly(propylene oxide) triol having a hydroxyl equivalent weight of 85.
POLYOL B is 1,4-butane diol.
POLYOL C is glycerin.
POLYOL D is trimethylolpropane.
POLYISOCYANATE A is a polymeric MDI having an isocyanate equivalent weight of 136.5 and a nominal isocyanate functionality of 3.0.
POLYISOCYANATE B is a polymeric MDI having an isocyanate equivalent weight of 131.5 and a nominal isocyanate functionality of 2.3.
POLYISOCYANATE C is a polymeric MDI having an isocyanate equivalent weight of 134 and a nominal isocyanate functionality of 2.7.
Trimerization Catalyst A is a (2-hydroxypropyl)trimethyl-ammonium 2-ethylhexanoate salt solution in ethylene glycol, available from Air Products and Chemicals as DABCO® TMR catalyst.
Trimerization Catalyst B is a solution of potassium acetate in ethylene glycol. It is available from Air Products and Chemicals as Polycat® 46 catalyst.
Trimerization Catalyst C is a blend of trimerization catalysts, available from Ele Corporation as PEL-CAT 9887-E.
Trimerization Catalyst D is a blend of trimerization catalysts, available from Ele Corporation as PEL-CAT 9887-G.
Urethane Catalyst A is a dibutyltin dilaurate catalyst sold by Air Products and Chemicals as DABCO® T-12.
Urethane Catalyst B is a 33% by weight solution of triethylenediamine in dipropylene glycol.
The Epoxy Resin is a diglycidyl ether of bisphenol A having an epoxy equivalent weight of 180.

Example 1 and Comparative Samples A, B and C

The formulations and test results for Example 1 and Comparative Samples A, B and C are given in Table 1.

TABLE 1

| | Comp. Ex. A | Comp. Ex. B | Comp. Ex. C | 1 |
|---|---|---|---|---|
| | Parts by Weight | | | |
| Formulation | | | | |
| Polyol A | 18 | 16 | 14 | 10 |
| Polyisocyanate A | 28.9 | 29.6 | 33.7 | 48.2 |
| Trimerization Catalyst A | 0 | 0 | 0 | 0.10 |
| Urethane Catalyst A | 0.05 | 0.04 | 0.02 | 0.04 |
| Isocyanate Index | 1.0 | 1.15 | 1.5 | 3.0 |
| Postcure temperature (° C.)/time (min) | 154/63 | 147/33 | 147/180 | 147/180 |
| Properties | | | | |
| $T_g$ after postcure (° C.) | 164 | 162 | 166 | 136 |
| 121° C. G' on postcured sample ($10^8$ Pa) | 6.5 | 6.6 | 6.2 | 4.7 |
| $T_g$ after humid aging (° C.) | 115 | 128 | 143 | 203 |
| 121° C. G' on humid aged sample ($10^8$ Pa) | 0.072 | 0.23 | 1.8 | 6.5 |

Comparative Samples A, B and C show the effect of varying isocyanate index without trimerization catalyst. As can be seen, the variations in isocyanate index have little effect on the glass temperature of the postcured sample. In each case, the glass transition temperature falls within a small range of 162-166° C., despite significant differences in the postcuring times and smaller differences in postcuring temperatures. The high glass transition temperature of Comparative Sample B (it being comparable to Comparative Samples A and C) indicates that the relatively mild postcuring conditions used in Comparative Sample B are adequate to achieve nearly full cure.

The effects of humid aging are indicated by the changes in G' at 121° C. and in the glass transition temperature. In the best of the Comparative Samples (C), the glass transition drops to below 150° C. (a loss of 23° C.), and the G' is reduced by about 70%. The performance of Comparative Samples A and B is even worse.

Example 1 performs much differently. After humid aging, the glass transition temperature of Example 1 material actually increases, very substantially, to 203° C. This value is much higher than any of the other samples, even before humid aging. 121° C. G' also increases, which is contrary to the behavior of the Comparative Samples.

Examples 2-9 and Comparative Sample D

The formulations and test results for Examples 2-9 and Comparative Sample D are given in Table 2.

TABLE 2

| Formulation | D* | 2 | 3 | 4 | 5 | 6 | 7 | 8 | 9 |
|---|---|---|---|---|---|---|---|---|---|
| | | | | Parts by Weight | | | | | |
| Polyol A | 14.7 | 10 | 7.6 | 7.6 | 7.6 | 7.6 | 10 | 10 | 0 |
| Polyisocyanate A | 35.4 | 40.1 | 42.7 | 42.7 | 42.7 | 42.7 | 40.1 | 40.1 | 15 |
| Trimerization Catalyst A | 0.15 | 0.15 | 0.25 | 0.25 | 0.05 | 0.05 | 0.15 | 0.15 | 0 |
| Urethane Catalyst A | 0.05 | 0.10 | 0.08 | 0.08 | 0.08 | 0.08 | 0.05 | 0.05 | 0.6 |
| Isocyanate Index | 1.5 | 2.5 | 3.5 | 3.5 | 3.5 | 3.5 | 2.5 | 2.5 | N/A |
| Postcure temperature (° C.)/time (min) | 160/60 | 120/65 | 80/70 | 160/60 | 160/60 | 80/70 | 160/60 | 80/60 | 80/25 |
| Properties | | | | | | | | | |
| $T_g$ after postcure (° C.) | 184 | 167 | 163 | 165 | 147 | 153 | 184 | 178 | 244 |
| 121° C. G' on postcured sample ($10^8$ Pa) | 7.2 | 10.6 | 10 | 8.4 | 10.7 | 2.3 | 8.2 | 8.2 | 2.8 |
| $T_g$ after humid aging (° C.) | 134 | 190 | 203 | 197 | 198 | 187 | 201 | 180 | 225 |
| 121° C. G' on humid aged sample ($10^8$ Pa) | 0.36 | 2.6 | 4.8 | 10 | 3.4 | 2.3 | 5.2 | 6.1 | 3.0 |

*Not an example of the invention.

Comparative Sample D is made at a 1.50 index, and in the presence of a trimerization catalyst. At this index, a large loss of glass transition temperature and 121° C. G' is seen after humid aging. By contrast, in each of Examples 2-8, glass transition temperature increases after the humid aging. The 121° G' values of these examples in some instances is higher and other instances is lower than those of the corresponding postcured samples. However, in all cases, they are much higher than Comparative Sample D, usually by almost an order of magnitude if not more. Example 9 differs from the others in being a polyisocyanurate rather than a polyisocyanurate-urethane. This one develops an especially high glass transition temperature after postcuring. After humid aging, some loss of glass transition temperature is seen, but the glass transition temperature nonetheless remains higher than any of the other samples.

Examples 10-14

The formulations and test results for Examples 10-14 are given in Table 3.

TABLE 3

| | 10 | 11 | 12 | 13 | 14 |
|---|---|---|---|---|---|
| | | Parts by Weight | | | |
| Formulation | | | | | |
| Polyol A | 8.7 | 6.8 | 8.9 | 7.0 | 8.9 |
| Polyisocyanate B | 0 | 0 | 41.1 | 43.0 | 41.1 |
| Polyisocyanate C | 41.3 | 43.2 | 0 | 0 | 0 |
| Trimerization Catalyst A | 0.25 | 0.25 | 0.25 | 0.25 | 0.25 |
| Urethane Catalyst A | 0.09 | 0.09 | 0.09 | 0.09 | 0.09 |
| Isocyanate Index | 3.00 | 4.00 | 3.00 | 4.00 | 3.00 |
| Postcure temperature (° C.)/time (min) | 120/60 | 120/60 | 120/60 | 120/60 | 120/60 |
| Properties | | | | | |
| $T_g$ after postcure (° C.) | 166 | 181 | 201 | 205 | 198 |
| 121° C. G' on postcured sample ($10^8$ Pa) | 8.2 | 5.8 | 4.8 | 3.5 | 4.5 |
| $T_g$ after humid aging (° C.) | 195 | 208 | 214 | 217 | 218 |
| 121° C. G' on humid aged sample ($10^8$ Pa) | 3.8 | 4.8 | 1.0 | 3.9 | 1.2 |

As with previous examples, the glass transition temperature increases after the humid aging step, with relatively small decreases in G'. G' actually increases for Example 13.

Examples 15-19

The formulations and test results for Examples 10-14 are given in Table 3.

TABLE 3

| | 15 | 16 | 17 | 18 | 19 |
|---|---|---|---|---|---|
| | | Parts by Weight | | | |
| Formulation | | | | | |
| 1,4-butanediol | 4.3 | 3.5 | 3.5 | 0 | 0 |
| Trimethylolpropane | 0 | 0 | 0 | 3.5 | 0 |
| Glycerin | 0 | 0 | 0 | 0 | 2.1 |
| Polyisocyanate A | 45.7 | 36.6 | 36.6 | 36.8 | 27.9 |
| Epoxy Resin | 0 | 0 | 10 | 10 | 7 |

TABLE 3-continued

|  | 15 | 16 | 17 | 18 | 19 |
|---|---|---|---|---|---|
|  | Parts by Weight | | | | |
| Trimerization Catalyst A | 0.15 | 0.15 | 0.15 | 0.15 | 0.10 |
| Urethane Catalyst A | 0.01 | 0.01 | 0.01 | 0.01 | 0.03 |
| Isocyanate Index | 3.5 | 3.5 | 3.5 | 3.5 | 3.0 |
| Postcure temperature (° C.)/time (min) | 160/60 | 120/60 | 160/60 | 160/60 | 120/60 |
| Properties | | | | | |
| $T_g$ after postcure (° C.) | 218 | 159 | 224 | 223 | 179 |
| 121° C. G' on postcured sample ($10^8$ Pa) | 1.5 | 1.9 | 2.8 | 2.4 | 3.9 |
| $T_g$ after humid aging (° C.) | 215 | 208 | 241 | 248 | 233 |
| 121° C. G' on humid aged sample ($10^8$ Pa) | 5.6 | 6.3 | 6.2 | 1.6 | 4.7 |

The glass transition temperature increases after the humid aging step in each case except Example 15. These sample show an increase in G'.

What is claimed is:

1. A method for making an isocyanurate or polyurethane-isocyanurate polymer, comprising
   a) curing an aromatic polyisocyanate or a mixture of at least one aromatic polyisocyanate and at least one polyol having a hydroxyl equivalent weight of up to 200 in which the isocyanate index is at least 2.00, in the presence of at least one isocyanate trimerization catalyst, to form a polyisocyanurate or polyurethane-isocyanurate polymer having a glass transition temperature of at least 100° C., and
   b) exposing the polyisocyanurate or polyurethane-isocyanurate polymer formed step a) to water in that is at least partly in the form of a liquid at a temperature of 70° C. to 140° C. and a pressure of 150 kPa to 5000 kPa.

2. The method of claim 1 wherein step a) is performed in the absence of a blowing agent to produce a polyisocyanurate or polyurethane-isocyanurate polymer having a density of at least 750 kg/m³.

3. The method of claim 2 wherein step a) is performed in the absence of a blowing agent to produce a polyisocyanurate or polyurethane-isocyanurate polymer having a density of at least 950 kg/m³.

4. The method of claim 1 wherein after step b) the polyisocyanurate or polyurethane-isocyanurate polymer has a density of at least 750 kg/m³.

5. The method of claim 4 wherein after step b) the polyisocyanurate or polyurethane-isocyanurate polymer has a density of at least 950 kg/m³.

6. The method of claim 1 wherein in step a) a mixture of at least one aromatic polyisocyanate and at least one polyol having a hydroxyl equivalent weight of up to 2.0 is cured, in the presence of at least one isocyanate trimerization catalyst and at least one urethane catalyst to form a polyurethane-isocyanurate polymer.

7. The method of claim 6 wherein the isocyanate index is 2.5 to 6.

8. The method of claim 7, wherein the glass transition temperature of the polyisocyanurate or polyurethane-isocyanurate polymer obtained in step a) is 150 to 225° C.

9. The method of claim 1, wherein step a) is performed by coating the aromatic polyisocyanate or the mixture of at least one aromatic polyisocyanate and at least one polyol onto the surface of a substrate, and curing the aromatic polyisocyanate or the mixture on the surface of the substrate to form a coating thereon.

10. The method of claim 1, wherein step a) is performed by is applying the polyisocyanurate or the mixture of at least one aromatic polyisocyanate and at least one polyol to a fibrous reinforcement and then curing the polyisocyanate or the mixture in the presence of the reinforcement to form a fiber-reinforced composite that includes a fiber phase that includes the fibrous reinforcement embedded in and bound together by the polyisocyanurate or polyurethane-isocyanurate polymer.

11. The method of claim 1 wherein the temperature in step b) is 100 to 130° C.

12. The method of claim 1 wherein step b) is performed for a period of time sufficient to increase the glass transition temperature of the polyisocyanurate or polyurethane-isocyanurate polymer by at least 5° C.

13. The method of claim 1, wherein step b) is performed during the use of the polyisocyanurate or polyurethane-isocyanurate polymer in its intended application.

14. The method of claim 1, wherein step b) is performed as a separate manufacturing step apart from use of the polyisocyanurate or polyurethane-isocyanurate polymer in its intended application.

* * * * *